US 10,701,950 B2

(12) United States Patent
Marder et al.

(10) Patent No.: US 10,701,950 B2
(45) Date of Patent: Jul. 7, 2020

(54) PROCESS AND A MACHINE FOR PRODUCING A FILLED SHEET OF PROCESS CHEESE, AS WELL AS A FILLED SHEET OF PROCESS CHEESE

(75) Inventors: Uwe Marder, Kolbermoor (DE); Klaus Kempter, Freising (DE); Gabriele Kopp, Munich (DE); Erich Laudenbach, Feldkirchen (DE); Oliver Schaar, Erpent (BE); Etienne Pirnay, Gesves (BE)

(73) Assignee: Intercontinental Great Brands LLC, East Hanover, NJ (US)

( * ) Notice: Subject to any disclaimer, the term of this patent is extended or adjusted under 35 U.S.C. 154(b) by 728 days.

(21) Appl. No.: 13/254,572

(22) PCT Filed: Mar. 5, 2010

(86) PCT No.: PCT/US2010/026288
§ 371 (c)(1),
(2), (4) Date: Feb. 17, 2012

(87) PCT Pub. No.: WO2010/102159
PCT Pub. Date: Sep. 10, 2010

(65) Prior Publication Data
US 2012/0141633 A1 Jun. 7, 2012

(30) Foreign Application Priority Data

Mar. 6, 2009 (EP) .................................... 09154502

(51) Int. Cl.
*A23C 19/09* (2006.01)
*A23C 19/084* (2006.01)

(52) U.S. Cl.
CPC ........ *A23C 19/0908* (2013.01); *A23C 19/084* (2013.01); *A23C 2250/10* (2013.01)

(58) Field of Classification Search
CPC .............. A23C 19/084; A23C 19/0908; A23C 2250/10
(Continued)

(56) References Cited

U.S. PATENT DOCUMENTS

| 4,473,344 A | 9/1984 | Sollich |
| 4,648,821 A | 3/1987 | Thulin |

(Continued)

FOREIGN PATENT DOCUMENTS

| DE | 2948154 A1 | 6/1981 |
| DE | 29620117 U1 | 1/1997 |

(Continued)

OTHER PUBLICATIONS

International Search Report dated Mar. 2, 2011 for PCT/US2010/026288.
(Continued)

*Primary Examiner* — Subbalakshmi Prakash
(74) *Attorney, Agent, or Firm* — Fitch, Even, Tabin & Flannery LLP

(57) ABSTRACT

A process of producing a filled sheet of process cheese, in which process cheese and a filling are co-extruded into a packaging material to produce a strand having a thickness, the strand is separated at predetermined locations to produce separate sheets, in which the filling is fully enclosed. A machine for producing filled sheets of process cheese, having a co-extrusion nozzle with an outer port for extruding an outer component and an inner port for extruding an inner component fully enclosed by the outer component into packaging material to form a co-extruded strand. The machine may comprise a device for reducing the thickness of the co-extruded strand, such as two or more cooperating rollers, and a device for separating the co-extruded strand, such as two or more rollers having ridges. A sheet of process (Continued)

cheese filled with a filling fully enclosed by the process cheese and having a thickness of 6 mm or less is also disclosed.

1 Claim, 3 Drawing Sheets

(58) Field of Classification Search
USPC .............................. 99/452; 426/89, 392, 582
See application file for complete search history.

(56) References Cited

U.S. PATENT DOCUMENTS

| | | | |
|---|---|---|---|
| 5,194,283 A | 3/1993 | Dupas et al. | |
| 5,480,666 A | 1/1996 | Lindgren | |
| 5,855,939 A | 1/1999 | Bogdan | |
| 6,395,321 B1 * | 5/2002 | Shaft et al. | 426/410 |
| 6,551,637 B1 * | 4/2003 | Fontenille | 426/89 |
| 6,579,550 B1 | 6/2003 | Baur | |
| 6,632,466 B2 | 10/2003 | Roussel et al. | |
| 6,814,996 B2 | 11/2004 | Murray et al. | |
| 7,005,153 B1 | 2/2006 | Shibauchi et al. | |
| 7,060,311 B1 * | 6/2006 | Milani et al. | 426/414 |
| 7,083,817 B2 | 8/2006 | Shibauchi et al. | |
| 2001/0019732 A1 | 9/2001 | Roussel et al. | |
| 2003/0129281 A1 | 7/2003 | Murray et al. | |
| 2004/0185158 A1 | 9/2004 | McHugh et al. | |
| 2005/0170053 A1 | 8/2005 | Milani et al. | |
| 2006/0127544 A1 | 6/2006 | Shibauchi et al. | |

FOREIGN PATENT DOCUMENTS

| | | |
|---|---|---|
| DE | 19933940 A1 | 5/2000 |
| EP | 0130772 B1 | 1/1985 |
| EP | 222595 | 5/1987 |
| EP | 0260194 A2 | 3/1988 |
| EP | 0403137 A2 | 6/1990 |
| EP | 0647410 A1 | 4/1995 |
| EP | 0771732 A2 | 5/1997 |
| EP | 1079698 | 3/2001 |
| EP | 1520481 A1 | 4/2005 |
| EP | 1797765 A1 | 6/2007 |
| GB | 2319457 A | 5/1998 |
| JP | 60-149359 | 8/1985 |
| JP | S61111648 A | 5/1986 |
| JP | 02-086507 | 3/1990 |
| JP | 02-124060 | 5/1990 |
| JP | 03-067543 | 3/1991 |
| JP | 04-135451 | 5/1992 |
| JP | 04135451 A * | 5/1992 |
| JP | H04507349 A | 12/1992 |
| JP | 05-336883 | 12/1993 |
| JP | 09-107941 | 4/1997 |
| JP | 2001-231531 | 8/2001 |
| WO | 91/02461 | 3/1991 |
| WO | 9959420 | 11/1999 |
| WO | 0018248 | 4/2000 |
| WO | 2010/102159 | 9/2010 |

OTHER PUBLICATIONS

European Patent Office, Extended European Search Report dated Aug. 26, 2009, in related European Patent App. No. 09154020 (9 pages).
Response dated Sep. 7, 2011, in related European Patent App. No. 09154502.0, (13 pages).
English translation of Japanese Patent Office Official Notice of Rejection dated Jan. 7, 2014 for Application No. 2011-553122 (5 pgs.).
English translation of the Technical Report Related to Brazil Patent Application No. PI1010250-7, dated Nov. 14, 2017 (6 pgs.).

* cited by examiner

PROCESS AND A MACHINE FOR PRODUCING A FILLED SHEET OF PROCESS CHEESE, AS WELL AS A FILLED SHEET OF PROCESS CHEESE

CROSS REFERENCE TO RELATED APPLICATIONS

This application is a national phase application of International Application No. PCT/US2010/026288, filed Mar. 5, 2010, claiming priority to European Application No. 09154502.0, filed Mar. 6, 2009, both of which are incorporated by reference herein in their entirety.

TECHNICAL FIELD

The invention relates to a process and a machine for producing a filled sheet of process cheese, as well as to a filled sheet of process cheese.

Sheets, e.g. typically rectangular and flat pieces of process cheese are well known as foodstuffs to be put on bread, toast or other dishes. The sheets can also be called slices, although they have not been cut from a block, but extruded.

BACKGROUND ART

In the field of extruding foodstuffs, EP 0 130 772 B1 describes a method of continuously co-extruding two dissimilar materials, i.e. an outer tube consisting of dough and an inner core surrounded by the outer tube so as to produce an extrudate rope. The extrudate rope is deposited on a horizontal conveyor and pressed in a transverse direction so as to seal the outer tube to itself and separate individual dough pieces.

U.S. Pat. No. 5,194,283 is related to co-extrusion of different types of cheese.

Finally, DE 296 20 117 U1 describes a combination of two slices of process cheese, which are sealed all around their circumference so as to enclose a filling in between.

SUMMARY OF THE INVENTION

One of the problems solved by the invention is to provide a process and a machine for an efficient and reliable mass production of a foodstuff having a novel dimension and a novel combination of different textures and tastes. The process solving these and other problems, as detailed below, is described in claim 1, the corresponding machine is detailed in claim 7, and the novel product is derivable from claim 16. Specific embodiments are given in the dependent claims.

The invention thus provides a process and a machine which allow an efficient and reliable mass production of a filled sheet of process cheese. Further, such a filled sheet of process cheese is provided and allows the consumer an entirely new experience in terms of texture and taste and a novel combination of different foodstuffs.

In the process described herein process or processed cheese and a filling are co-extruded to produce a filled strand having a thickness in a direction perpendicular to an extrusion direction in a first step. In other words, the process described herein is a continuous process, which, in a first step, produces a continuous, filled strand, the outside of which is entirely constituted by the process cheese, and the filling is continuous and fully enclosed by process cheese.

The process cheese is preferably supplied in a hot, i.e. molten state which means, for example, a temperature of about 70° C. or above.

In particular, it is currently preferred to use a meltable process cheese in the invention described herein. In other words, the process cheese should not have been treated by what is called a creaming process taking away the meltability of the process cheese at the mentioned temperatures, and turning the process cheese into a spreadable instead of a meltable process cheese. Whereas it is generally possible to apply the invention to a process cheese, which is spreadable and/or has undergone a creaming process, it is, as mentioned, currently preferred to use meltable process cheese.

In an optional second step, the continuous strand is reduced in thickness, and in a third step, the strand is separated at predetermined locations to produce separate sheets. In connection with this separating step, the filled strand is already in a state, in which its thickness is substantially equal to the thickness of the final product, and may, for example, have a thickness of 6 mm or less, with the filling being present with a weight percentage, based on the total weight of the sheet, of 15% or more, particularly 15% to 45% and preferably 25% to 35%. Thus, the separating step can easily be carried out by pushing the process cheese along a virtual line over the surface of the strand and in a direction substantially corresponding to the thickness direction thereof, towards the process cheeses on the other side. During this operation, the process cheese will be substantially displaced in the "pushed areas" and will form the transverse edge of the final product. It is noted that the longitudinal edges of the final product have substantially the same direction as the direction of co-extrusion. As alternative to the above pushing or moving the process cheese from one side towards the other side, the process cheese may also be pushed from both sides of the strand towards the center so that the process cheese from both sides, which was separated by the filling in between, meets at approximately the center. This also makes separate sheets from the continuous strand. It is also noted in this context that the continuous strand will preferably be extruded into a continuous "tube" of packaging material, such as a thin, transparent plastic film, so that the process cheese forming the outer envelope of the strand can easily be subjected to the above operation without sticking to the equipment, such as rollers, which may be involved to reduce the thickness of the strand and/or to separate the strand into individual sheets.

In these filled sheets, the transverse edges are advantageously made of process cheese so that the filling is fully enclosed by process cheese. Thus, in the final product, the consumer can experience a novel combination of texture, taste and appearance. Whereas the outer component, i.e. the process cheese, may have a gel-type texture, the filling can have a cream or paste-like texture. Further, the process cheese may be meltable at temperatures of, for example, above 70° C., whereas the filling may substantially keep its shape and texture at these kind of temperatures. Thus, various foodstuffs, such as toast or pasta, can be combined with the product described herein and may, after heating them, have a cover of molten process cheese and of a creamy component, which has substantially not been affected by the mentioned temperatures, such as a component of fresh cheese or tomato sauce. In a similar manner, the taste of process cheese can be combined with further taste components which are derivable from the different conceivable types of fillings described in more detail below. Finally, the light yellow or white appearance of process cheese can be combined with different colours, such as the white colour of a second process cheese forming the filling, red of tomato sauce or green of pesto sauce in order to create a unique combination of colours in the product produced by the method described herein. The described novel type of a filled process cheese can, in particular, be processed very efficiently, i.e. with an output of, generally, 50 to 1500, preferably 300 to 700 or 300 to 500 sheets per minute and with a substantially even surface. Thus, all of the advantages of process cheese slices can be maintained, and the advantages of providing a filling are added.

As indicated above, the filled strand may be co-extruded into a packaging material which may be sealed during the step of separating the strand into individual sheets. The packaging material may further be cut downstream of the above process to produce individual, separately packaged sheets of filled process cheese. The packaging material may, for example, be supplied as a continuous web of transparent plastic film, may be wrapped around a co-extrusion nozzle and may be provided with a so-called fin seal extending substantially in the extrusion direction, to produce a continuous pipe, tube or hose of packaging material. As mentioned, the co-extruded strand is extruded into this tube, and in one step with the separation of the strand, the packaging material may be sealed to itself at the locations, where the continuous strand has been separated. The later cutting of separate package sheets may be performed in these sealed areas. In the final product, the fin seal may be provided on one of the flat surfaces of the sheet of process cheese to allow the consumer to easily open the package at the fin seal.

As a next step after separating the continuous strand to produce individual sheets, it has turned out to be advantageous to cool the sheets of filled process cheese. If the cooling is done comparatively quickly after the separation of individual sheets, any mixing between the outer process cheese and the inner filling can be significantly reduced in order to advantageously keep the above-described distinct components in terms of texture, taste and appearance.

As far as the filling is concerned, this may, with benefits for the consumer, for example, be a second type of process cheese, which may also be meltable at temperatures of about 70° C. or above, or a fresh or soft cheese, such as the product sold under the trademark "Philadelphia" by the applicant, or a pesto or tomato sauce, or marmalade, jam or jelly, or even chocolate.

It has further been found that both in terms of consumer satisfaction and producibility, filled sheets of process cheese with a thickness of 6 mm or less, preferably 5.5 mm or less and/or a weight of 45 g or less, preferably 40 g or less are preferable. With these dimensions, the filled sheets of process cheese do not give the impression of a "doubled" slice of process cheese with a filling in between. Rather, the filled sheets of process cheese have, at the most, the thickness and/or weight of two conventional slices of process cheese. However, due to the filling, which is present in addition, the product described herein does not give a "bulky" or unattractive impression. A lower limit concerning the thickness of the filled sheets of process cheese described herein, may be 4 mm and/or 30 g, preferably 35 g. The sheets may further be substantially square in shape and have a length and/or width of 8 cm to 9 cm.

The co-extrusion process described herein may be performed vertically, preferably downwards, or horizontally or in any other orientation. Particularly, when performing the process with an extrusion direction, which is horizontal or close thereto, it has been found that reliability of the co-extrusion can be improved if the flow of process cheese and/or of the filling is controlled at only a portion of the cross-sectional area, through which extrusion is performed. Thus, when the cross-sectional area (which can be seen in a plane perpendicular to the extrusion direction) is viewed, the flow, for example of the process cheese, may be partly blocked in a bottom area in order to achieve a more uniform distribution of the related component, for example the process cheese. This is based on the finding, but not limited thereto, that substantially horizontal extrusion causes the extruded mass to flow (due to gravity) towards the bottom. This can be counteracted by the above-mentioned control.

It has proven particularly efficient for a reliable and steady production, particularly with the process cheese and the filling substantially strictly separated in the final product, to provide a laminar flow, preferably a creeping flow, of the process cheese and/or the filling, preferably of both components, to the co-extrusion nozzle. Laminar flow denotes a type of flow in which friction forces, particularly at the surrounding walls, dominate and the flow is "well ordered". In contrast, when inertial forces dominate, the flow becomes "turbulent". Between laminar and turbulent flow, there is a transition type of flow. The Reynolds number Re is conventionally used for characterizing the flow type. In substantially tubular pipes, the transition from laminar to turbulent flow occurs at a Reynolds number in the order of 1,000-3, 000.

The general formula for the Reynolds number characterizing the flow in a pipe is defined as $Re=\rho \cdot V \cdot D/\mu$, where $\rho$ is the fluid density, V is the mean fluid velocity, D is the hydraulic diameter and $\mu$ is the dynamic viscosity of the fluid. The hydraulic diameter is defined as $4 \cdot A/C$, where A is the cross-sectional area and C is the wetted perimeter. For a circular pipe, the hydraulic diameter is equal to the inside pipe diameter. In an example of the process described herein, the cross-sectional area of the inner nozzle is approximately 210 mm$^2$ and that of the outer nozzle is approximately 1,144 mm$^2$. At a density of 1,020 kg/m$^3$ and a mass flow of 0.008 kg/s and 0.013 kg/s for the filling and process cheese, respectively, the flow velocity is approximately 0.037 m/s for the filling and 0.011 m/s for the process cheese. With a wetted perimeter of about 100 mm and a viscosity of about 400 mPa·s, the Reynolds number is about 0.79 for the filling. Likewise, with a wetted perimeter of about 258 mm and a viscosity of approximately 600 mPa·s for the process cheese, the Reynolds number is 0.33. These figures are significantly below the Reynolds number at which turbulent flow occurs, thus reflecting advantageous laminar flow conditions. Even with mass streams in an industrial scale, which may be about 20 to 30 times as high as the above mentioned values, the Reynolds number stays well below 2,300, which is the conventionally accepted limit for transitional flow to occur in a pipe. In one embodiment, the Reynolds number in the process of the present invention is below 50. It is preferably below 10 and more preferably below 1.

For efficiently maintaining a laminar flow also at a higher throughput, it may be preferred to subject the process cheese and the filling to co-extrusion at a constant over-pressure, for example within the range of from 1 to 10 bar, preferably 1.5 to 8 bar and even more preferably 2 to 6 bar. Too high a pressure may deform the nozzle.

As regards the viscosity of the extruded material, specifically considering the desired laminar flow, a value within the range of from 200 to 10,000 mPa·s may be preferable, more preferably 400 to 6,000 mPa·s and even more preferably 500 to 4,000 mPa·s. Viscosities were measured with a controlled-stress rheometer (Bohlin CVO 120) with a concentric cylinders (rough surface), a gap of 6 mm, at a temperature of 70° C., pre-shear conditions of 3 minutes at 10/s, an equilibrium time of 3 minutes and a shear rate of 100/s.

Advantageously, also in view of viscosity and for allowing obtaining thin slices, the process cheese and/or the filling are extruded in a liquid and/or hot state which allows the separation of sheets of process cheese, fully enclosing the filling, after a co-extrusion of a strand into the packaging material. For example, the extrusion temperature may be in the range of 60 to 98° C., or 70 to 80° C. Preferably, the process cheese is extruded at a temperature 65° C. or more, or 65 to 85° C., more preferably 75 to 85° C. The preferred extrusion temperature for the filling is 65° C. or more, or 65 to 90° C., more preferably 80 to 90° C. This also provides for a long shelf life, such as at least 5 months at a temperature in the range of 2-10° C., and pasteurization of the packaging.

For a beneficial process, it may be preferred to maintain the moisture in the process cheese and filling at 50% by weight or more, especially in view of costs and shelf life. Further, for reducing water migration between the process cheese and the filling, it is preferred to keep the difference in moisture content between the process cheese and the filling at 10% or less, preferably 5% or less, more preferably 2% or less, in terms of percentage points.

For accomplishing the desired viscosity ranges, the composition of the process cheese and/or filling can be adjusted accordingly, e.g., by selecting appropriate types and proportions of ingredients such as milk protein and other dairy powders, as is conventionally known in this art. In this regard, it may be preferable to adjust the pH values of the process cheese on the one hand and the filling on the other hand such that they do not differ by more than 2.0 units, preferably not more than 1.0 units and more preferably not more than 0.5 units.

The invention further provides a machine for producing a filled sheet of process cheese having a co-extrusion nozzle with an outer port for supplying an outer component and an inner port for supplying an inner component, which is fully enclosed by the outer component. As indicated above, the outer component may, for example, be process cheese, and the inner component may be one or more of the fillings mentioned above. The machine described herein further optionally has a device for reducing the thickness of the co-extruded strand, which may, for example, be formed by two or more cooperating rollers, and/or a device for separating a co-extruded strand such as two or more rollers having ridges. Since the inner and outer components for producing filled sheets of process cheese are co-extruded into packaging material, as device for supplying packaging material is provided.

In the machine described herein, at least the inner port may be substantially flat in cross-section, i.e. having first sides being longer than second short sides. This cross-section, which may, for example, be rectangular, preferably with rounded edges or short sides, corresponds to the desired final product, i.e. a flat sheet or slice of filled process cheese. Further, the outer port may be greater in cross-section adjacent at least one first (long) side of the inner port than adjacent other areas of the inner port. In other words, the boundary defining the outer port is spaced apart from the inner port for a greater distance at least one long side of the inner port, as compared to other areas. This kind of diverted shape of the outer port as compared to the inner port is at least present at the extrusion opening itself, i.e. where the components exit the ports, but may also be present in any tubes, pipes or similar elements, which supply the components to the port. It has been found that, with the described shape, the step of reducing the thickness of a continuous co-extruded strand can be reliably performed without the risk of the outer component becoming too thin or even ruptured so as to expose the inner component. The described greater cross-sectional area or greater distance in the area of the long sides of the inner port provides for a sufficient mass of outer component which can, in the step of reducing the thickness of the strand, be pushed aside, i.e. towards the edges, and still keeps the desired thickness of the outer component along the surfaces of the filled sheet of process cheese. Further, with the described design, filled slices of process cheese can be produced, in which the filling extends over a major part of the cross-section and is not only present substantially in the center and is absent at major portions towards the edges.

Experiments have shown particularly good results with an outer port having a substantially oval shape, and an inner port having a substantially flat, rectangular shape with rounded second, short sides.

Concerning the supply of the components to be extruded to the outer and/or the inner port, these ports may each be in communication with a tube having a cross-section substantially corresponding to that of the respective port.

As an alternative or combined therewith, at least one of the ports may be in communication with at least one pipe or hose, which may, for example, have a substantially circular cross-section in contrast to the cross-sectional shapes indicated above. Any pipes may terminate (in flow direction) before the respective port. As an alternative, the pipes may extend to the inner and/or outer port. The use of pipes to supply the filling and/or the process cheese to the respective port has proven efficient for improving the uniformity of the distribution of process cheese and/or filling over the cross-section of the port. Further, adjusting the flow characteristics individually for one or more pipes, for example by adjusting the operating speed of one or more pumps, to which a pipe is connected, leads to further improvement, for example with regard to the uniform distribution of process cheese and/or filling over the cross-section. Finally, pipes have shown to be advantageous with regard to the behavior when production has to be stopped. In particular, it has been found that the necessity to immediately clean the machine is reduced when pipes are used. One or more of the above-mentioned tubes, pipes or hoses may, for example, be made from stainless steel or a suitable plastic.

In order to control the flow of one or more of the components to be extruded, particularly in horizontal co-extrusion, the cross-sectional area of at least one tube and/or pipe may be partially blocked, for example, by a ridge or a flap. By way of example, such a ridge or flap may be present at the bottom of a tube, such as the nozzle, supplying the outer component to the outer port.

In order to provide versatility with regard to different types of components having differing characteristics, the one or more blocks in the supply lines, such as a ridge or flap, may be adjustable. In other words, their position and/or size, such as their height may be adjustable to influence the flow of the component.

The inner and outer port may generally be at different locations along the extrusion direction, i.e. the inner component may be extruded into the outer component before the latter is extruded, i.e. leaves the port, or the outer component may be extruded first, for example, into a packaging material, and the inner component may be extruded into the already extruded outer component. However, experiments have shown best results with ports which are at substantially the same level, i.e. the components are extruded at substantially the same location along the extrusion direction. In particular, it has been found that the filling can in this case be placed particularly well centered and well covered by the outer component.

The machine described herein may further have a device for supplying a packaging material, into which the mentioned components are co-extruded and/or a device for sealing a packaging material to itself, which may be combined with the device for separating the co-extruded strand, and/or a cooling area such as a water bath and/or refrigerated or cooled wheels, on the periphery of which the filled process cheese may be placed for cooling, and/or a device for severing separate packages enclosing filled slices of process cheese so as to produce individual packages containing the mentioned product. The above-described devices substantially correspond to the process steps indicated above and provide corresponding advantages.

As regards an advantageous horizontal nozzle design (FIGS. 4, 5, 6 and 7) in order to help to accomplish the desired co-extrusion conditions for avoiding turbulences, including overpressure, the cross-sectional area of an inner nozzle leading to the inner port is preferably reduced by a factor of 6 or less, and a cross-sectional area of an outer nozzle leading to the outer port is reduced by a factor of 3 or less, over a length of 30 cm.

For supporting a steady laminar flow, preferably in a vertical nozzle design (FIGS. 2, 3 and 8), it is currently preferred to have a substantially constant cross-section of the nozzle along the flow direction, for a length of between about 4 and about 10 cm upstream of the port(s) and starting at the port, i.e. for the last about 4 to about 10 cm of the nozzle 22. In addition to the considerations based on the Reynolds number as discussed above, the inventors have found that, for producing a filled sheet which is 90 mm wide, the outer nozzle is preferably 50-85 mm wide and/or 10-40 mm thick, preferably 60-80 mm wide and/or 15-30 mm thick, more preferably 65-75 mm wide and/or 20-25 mm thick. The inner nozzle is for example 30-80 mm wide and/or 2-20 mm thick, preferably 40-70 mm wide and/or 4-15 mm thick and more preferably 45-60 mm wide and/or 5-10 mm thick. The shape of one or both nozzles can for example be substantially rectangular, preferably slight oval with a distance from the inner to the outer nozzle of 5-10 mm. The distance can change over the perimeter as described above.

Finally, the invention also provides a sheet of process cheese filled with a filling which is fully enclosed by the process cheese, and having a thickness of 6 mm, preferably 5.5 mm or less. Conceivable types of fillings are mentioned above. Moreover, the filled sheet of process cheese described herein may have substantially even surfaces which may, for example, be described by the fact that the thickness variation over 80% of the surface, i.e. disregarding irregularities which may occur towards the edges, is 10% and/or 0.5 mm or less.

As far as further characteristics, benefits and advantages of the novel product are concerned, reference is made to the above description concerning the process and machine for producing same.

BRIEF DESCRIPTION OF THE DRAWINGS

Hereinafter the invention is further described by a non-limiting example thereof and with reference to the drawings, in which FIG. 1 schematically shows a machine in accordance with the invention and performing the method described herein.

DETAILED DESCRIPTION OF PREFERRED EMBODIMENTS OF THE INVENTION

Figure 1:
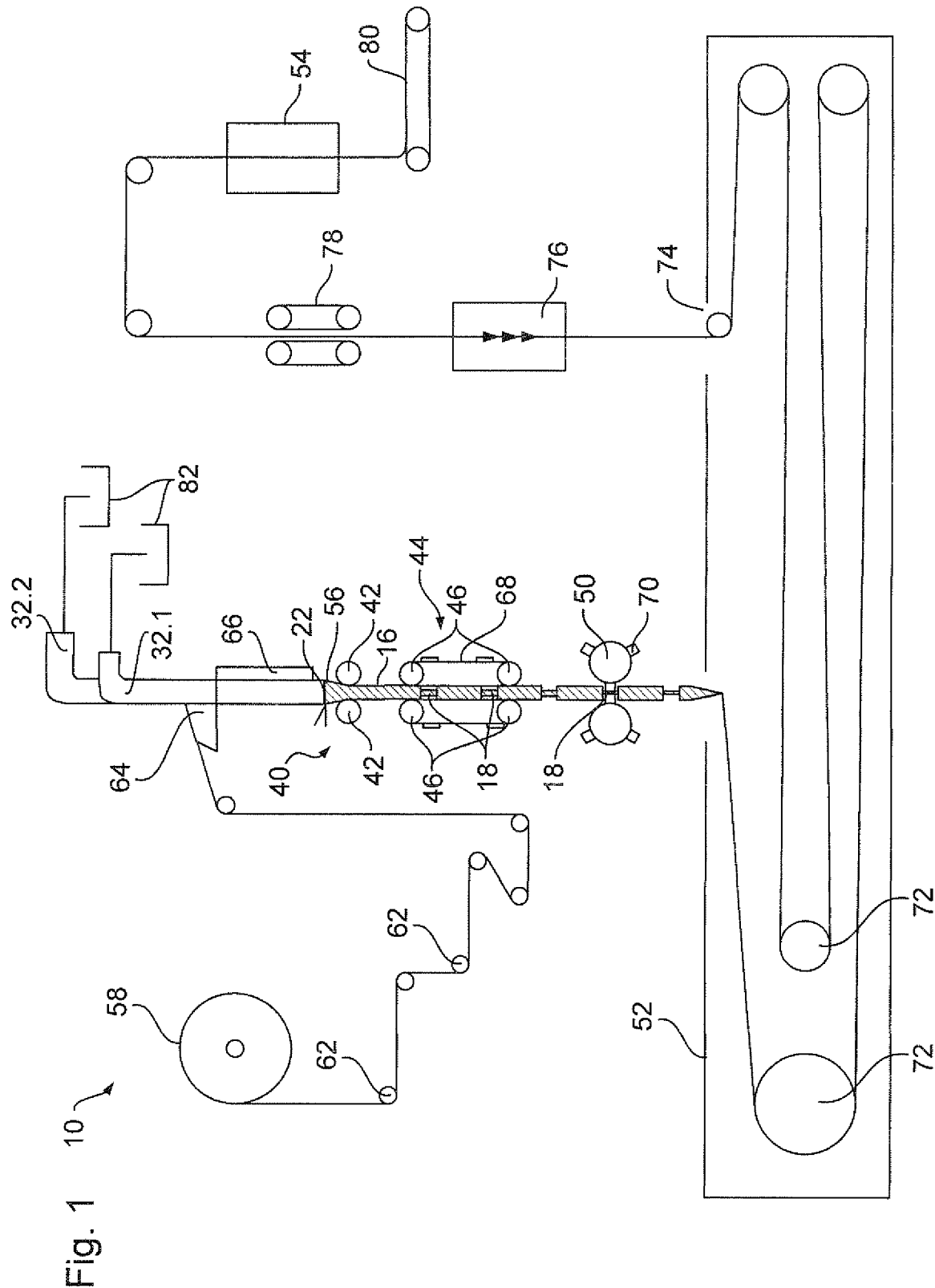

As can be taken from FIG. 1, a machine for producing filled sheets of process cheese has a first, inner tube 32.1 for supplying process cheese and a second, outer tube 32.2 for supplying a filling to a co-extrusion nozzle 22. As will be described in more detail below with reference to FIG. 2 to 7, the inner tube 32.2 is inserted into the outer tube 32.1, and both tubes 32 end, in the embodiment shown, at co-extrusion nozzle 22. Through the nozzle 22, a filling which is surrounded by process cheese all around its periphery, is extruded into a substantially continuous and hose-like packaging material which is formed, at the co-extrusion nozzle 22, into a substantially flat rectangular shape. In this context, it is noted that any parts of the machine shown in FIG. 1 and described below, apart from the tubes 32 and the co-extrusion nozzle 22, may be taken from known machines for producing sheets or slices of process cheese. Before the packaging material 56 reaches the nozzle 22, it has been unwound from a roll 58 and has, via various rollers 62, been passed to a so-called shoulder 64, through which the packaging material is wrapped around the outer tube 32.1 and sealed in longitudinal (i.e. vertical) direction in FIG. 1 by a sealing device 66. The process cheese and/or the filling may be pumped to the tubes 32 from respective tanks 82 in which the process cheese and/or the filling may be stored.

At co-extrusion nozzle 22, the filling, completely surrounded with process cheese, is extruded into packaging material 56 and is, in this state, passed through a nib between rollers 42 which serve as a device 40 for reducing the thickness of the co-extruded strand 16. This strand 16 is, in the embodiment shown, passed through a device 44 for separating the co-extruded strand 16, in particular through the nib between a further set of rollers 46, in which the two rollers on each side of the strand 16 are connected by a belt 68 which may have ridges (not shown). It is also not shown that the ridges of the belt 68 on one side are aligned with ridges on the belt of the other side so that the aligned ridges cooperate to exert pressure from both sides onto the co-extruded strand 16 so that the packaging material on one side abuts the packaging material on the other side, and any process cheese and filling which used to be present in this area, is pushed aside so as to form the transverse edges at predetermined locations 18 in the final product. This is because a further device 50, in the embodiment shown having two cooperating rollers with heated ridges 70 on them, seal the packaging material to itself to produce separately packaged filled slices of process cheese. These separately packaged slices are still present in a continuous manner and enter, in this state, a cooling area 52, in the embodiment shown a water bath. As can be taken from FIG. 1, the continuous series of individually packaged filled slices of process cheese may be passed through the water bath 52 over various rollers 72 for a time sufficient for cooling the described product.

After the continuous series of filled slices leaves the water bath at 74, any remaining water is removed in the embodiment shown by brushes 76. The continuous transport of the described product is, in the embodiment shown, performed by a suitable conveyor 78 having two pairs of operating rollers, on which an endless belt is wound. Further downstream, a device 54 for cutting the continuous series into single sheets may be present. Finally, an additional conveyor 80 for transporting single sheets or stacks of sheets to a final packaging station or similar devices may be present.

Figure 2:
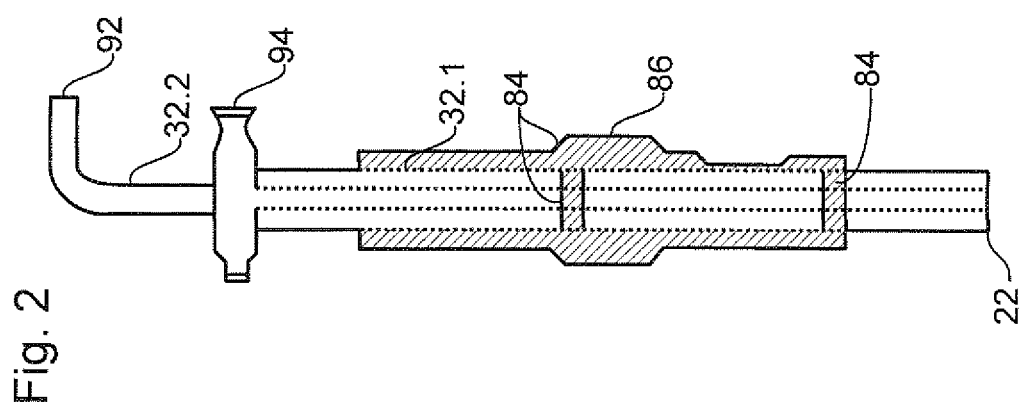
FIG. 2 schematically shows a detail of FIG. 1.

FIG. 2 shows details of the tubes 32. In particular, it can be seen in FIG. 2 that the inner tube 32.2 is inserted into the outer tube 32.1 and kept spaced apart from the inner periphery of the outer tube 32.1, in the embodiment shown, by suitable spacers 84. In the embodiment shown in FIG. 2, a holder 86 for attaching the assembly shown in FIG. 2 to the machine schematically shown in FIG. 1, is present.

Figure 3:
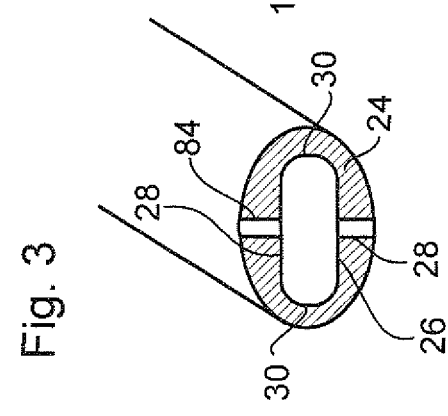
FIG. 3 shows the extrusion ports of the machine shown in FIG. 1.

FIG. 3 shows details of the co-extrusion nozzle 22 (see FIG. 2). As shown in FIG. 3, the inner ports 26 of the co-extrusion nozzle 22 may, for example, have a flat, substantially rectangular cross-section with first, long sides 28 and rounded edges 30. The outer port 24 may, for example, be substantially oval so that it is spaced from the inner port with a greater distance along the long sides 28 of the inner port 26 than at the short sides, i.e. the rounded edges 30. In FIG. 3, the spacers are indicated by pins, which merely act as an example for forming the spacers 84. The inlet of the inner tube 32.2 is denoted with 92 and the inlet of the outer tube 32.1 is denoted with 94.

Figure 4:
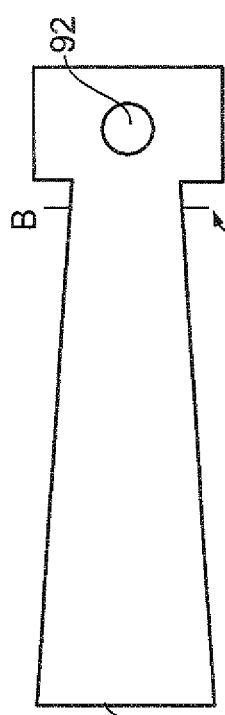
FIG. 4 shows a top view of an alternative inner tube and inner port to be employed in a machine similar to that of FIG. 1.
Figure 8:
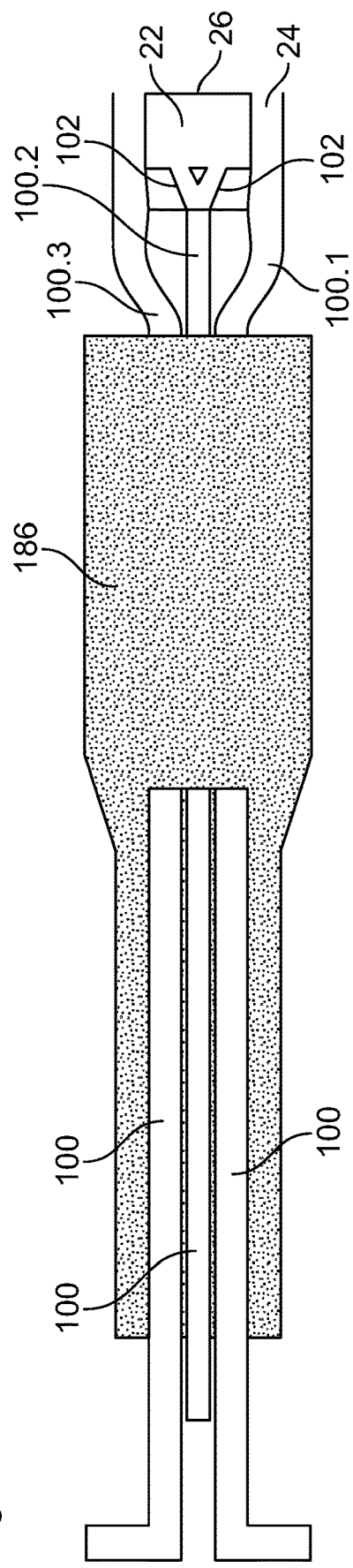
FIG. 8 shows a top view of a further alternative to the embodiments of FIG. 2 to 7.

FIG. 4 shows a top view of an alternative inner tube 132.2. It is noted that this type of inner tube is particularly suitable for a situation and machine, in which co-extrusion is carried out substantially horizontal, whereas the embodiment of FIGS. 2, 3 and 8 is mainly intended for vertical co-extrusion as shown for the machine in FIG. 1. The embodiment of FIG. 4 is substantially rectangular in cross-section and diverges laterally in extrusion direction A, as shown in the top view of FIG. 4.

Figure 5:
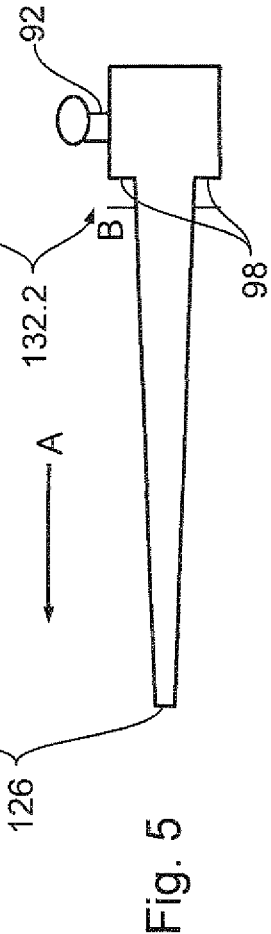
FIG. 5 shows a side view of the inner tube and inner port of FIG. 4.

It can be taken from FIG. 5 that the inner tube 132.2 converges in thickness direction. This design has been found to provide an advantageous pressure reduction in the inner tube 132.2.

Figure 6:
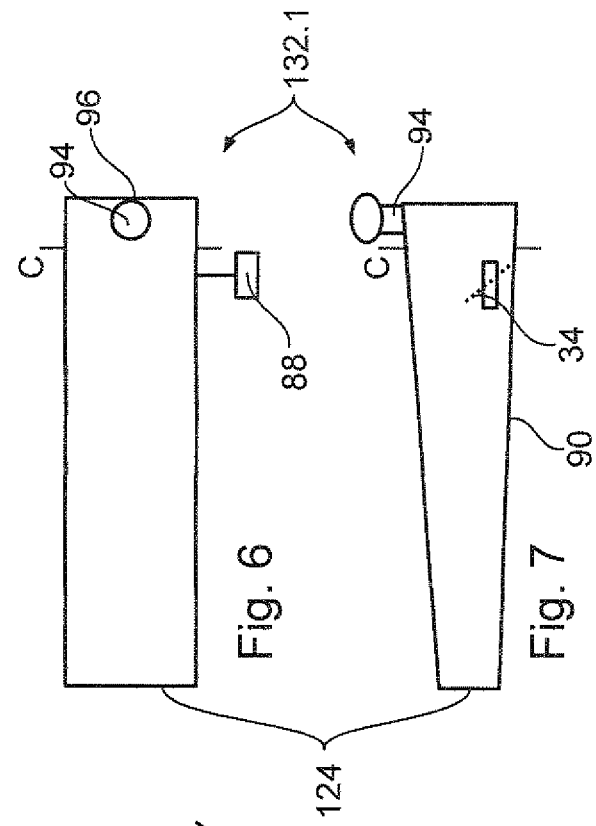
FIG. 6 shows an alternative outer tube and outer port to be employed in a machine similar to that of FIG. 1.
Figure 7:
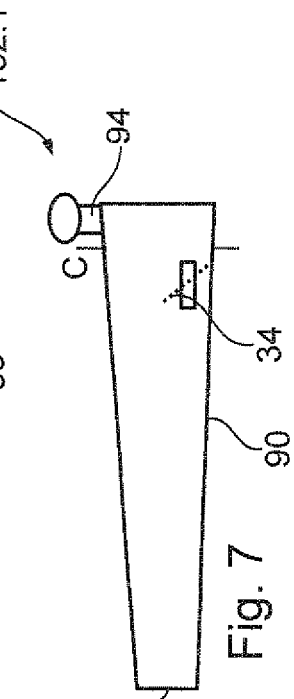
FIG. 7 is a side view of the outer tube and outer port of FIG. 6.

FIG. 6 shows a top view of an alternative outer tube 132.1, for which it can be taken that the width of the cross-section remains essentially the same in lateral direction over extrusion direction A. FIG. 6 schematically shows a screw or knob 88 which may be turned to adjust the position of a flap 34 (FIG. 7) in order to adjust the flow of process cheese in the tube 132.1 particularly at the bottom 90 thereof. Thus, the flap 34 may be rotated about an axis which extends substantially perpendicular to the plane of the drawing of FIG. 7 and thus presents a kind of obstacle, which avoids the gathering of excessive process cheese in the area towards the bottom 90 and thus aids in providing a substantially uniform distribution of process cheese. As indicated in FIG. 7, the cross-section of tube 132.1 may converge in a thickness direction.

The inlet of the inner tube 132.2 is denoted with 92. The inlet of the outer tube 132.1 is denoted with 94. It should also be noted that the inner tube 132.2 is inserted into the outer tube 132.1, in the embodiment shown from the right side thereof, so that the edge 96 of the outer tube 132.1 abuts in the assembled state the step 98 in the inner tube 132.2. It has been found for the combination of inner 132.2 and outer tube 132.1 shown in FIG. 4 to 7 having the depicted and described diverging/converging cross-sections that pressure drops or losses are advantageously substantially avoided in both the inner 132.2 and the outer tube 132.1. In the specific embodiment, the cross-sectional area of the inner tube is reduced by a factor of, e.g. approximately 6. In other words, the cross-sectional area at the inner port 126 is approximately one sixth of the cross-sectional area at the beginning of the inner tube (location B in FIGS. 4 and 5). In the embodiment shown, also the effective cross-sectional area of the outer tube 132.1, which is determined by the shape of the outer tube and the shape of the inner tube inserted therein, is reduce so as to advantageously substantially avoid pressure losses. In the embodiment shown, the cross-sectional area is reduced by a factor of approximately 3. In other words, the cross-sectional area at the outer port 124 is approximately one third of the cross-sectional area at the beginning of the outer tube 132.1, i.e. location C in FIGS. 6 and 7.

The mentioned changes of the cross-sectional areas extrusion direction A are, in the embodiment shown, obtained by a shape of the inner tube, which diverges in a top view (FIG. 4) but converges in a side view (FIG. 5). In the embodiment shown, the size of the outer tube stays approximately the same in a top view (FIG. 6) but converges in a side view (FIG. 7). Further, as mentioned, the effective cross-sectional area of the outer tube is also affected by the shape of the inner tube 132.2 inserted therein. It is also noted that the changes of cross-sectional areas are formed in a uniform manner, as shown in FIGS. 4 to 7. This aims to provide a uniform extrusion process. In particular, the reduction of the effective cross-sectional area of the outer tube as mentioned above in combination with the inner tube diverging in the top view (FIG. 4) has proven efficient in this respect. The ports of the inner 132.2 and outer tube 132.1 formed at the ends (as seen in extrusion direction A) thereof may be formed as shown in FIG. 3. Alternatively, the outer 124 and/or inner ports 126 may have substantially rectangular shapes. Particularly in this case, the dimensions at the outer 124 and inner ports 126 may correspond to the (cross-sectional) dimensions of the filled sheets of process cheese to be produced, i.e. there may be no need to reduce the thickness of the co-extruded, filled strand between extrusion and the separation of the individual sheets.

FIG. 8 shows an alternative embodiment for supplying the process cheese and/or the filling to the co-extrusion nozzle 22. In this embodiment, three pipes 100 having a substantially circular cross-section are employed to supply the mentioned material to the nozzle 22. It should be noted that more or fewer pipes may be present. Further, in the embodiment shown, the pipes end (in flow direction) before the end of the nozzle 22, i.e. before the location, where the ports 24, 26 are present. In the embodiment shown, the center pipe 100.2 is branched into, in the embodiment shown, two lines 102 to improve uniformity of the filling in that part of the nozzle 22, which terminates at the inner port 26. The outer pipes 101 and 103 supply process cheese to the outer area of the nozzle 22 and eventually to the outer port 24. A holder for holding the pipes 100 together and/or for allowing attachment of the assembly of pipes 100 to a machine such as the one shown in FIG. 1 is denoted 186.

Figure 9:
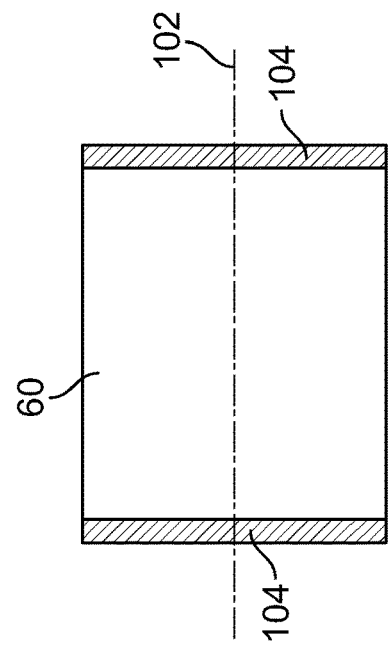
FIG. 9 shows a top view of the inventive product.

FIG. 9 shows a plane view of a sheet 60 of process cheese packaged by a packaging material sealed to itself at a longitudinal seal indicated at 102 and transverse seals 104. The length (measured along the longitudinal seal 102) and/or the width (measured along the transverse seal 104) may, for example, be 8 cm to 9 cm, and the product shown in FIG. 9 may, for example, have a weight of 30 to 45 g, preferably 35 g to 40 g. The thickness or height, measured perpendicular to the plane of the drawing of FIG. 9, may, for example, be 4 mm to 6 mm.

Figure 10:
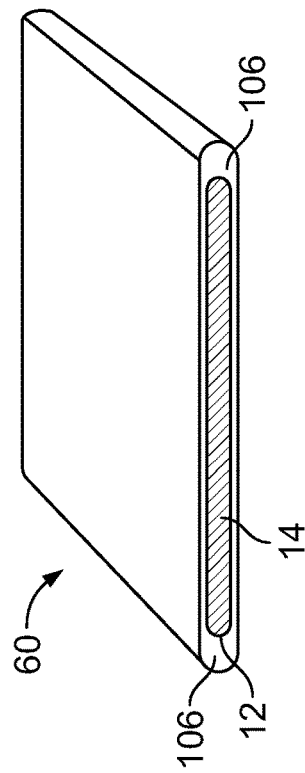
FIG. 10 shows a cut perspective view of the inventive product.

FIG. 10 shows a cut perspective view, substantially along the longitudinal seal 102 of FIG. 9. As can be taken from FIG. 10, a filling 14 is covered on all sides with process cheese 12 and is present in essentially the entire product. In particular, the width of the edges 106, where no filling is present, may substantially be the same or insignificantly greater than the thickness of process cheese 12 above and below the filling 14.

EXAMPLE

The process cheese 12 of the above-described product may, for example, be produced with the following compositions:

| | |
|---|---|
| Water/Condensate | 35.20% |
| Mozzarella cheese | 32.20% |
| Emmental Cheese | 9.90% |
| Butter | 9.60% |
| Milk Protein Powder | 8.20% |
| Emulsifying salts | 2.20% |
| Whey powder | 2.00% |
| Sodium Chloride | 0.50% |
| Lactic Acid | 0.20% | or

| | |
|---|---|
| Emmental Cheese | 40.00% |
| Water/Condensate | 31.50% |
| Cheddar Cheese | 9.80% |
| Butter | 5.60% |
| Whey powder | 4.70% |
| Milk Protein Powder | 5.00% |
| Emulsifying salts | 2.10% |
| Sodium Chloride | 0.80% |
| Lactic Acid | 0.50% |

The process cheese may, for example, be prepared by grinding the cheese, mixing all ingredients, heating the mixture, for example with direct steam to 85° C., and cooling the resulting process cheese to 75° C. Thereafter, the process cheese may be supplied to the co-extrusion nozzle as described above.

A filling of process cheese may, for example, be prepared from the following composition

| | |
|---|---|
| Full Fat Soft Cheese | 72.10% |
| Butter | 11.95% |

| | |
|---|---|
| Water/Condensate | 9.70% |
| Milk Protein Powder | 5.00% |
| Emulsifying salts | 0.80% |
| Citric Acid | 0.20% |
| Sodium Chloride | 0.15% |
| Oleoresin Paprika | 0.10% | by mixing all ingredients, heating the mixture, for example with direct steam to 85° C., and subsequently cooling to 75° C. Thereafter, the filling, in this example a process cheese, is ready for being supplied to the co-extrusion nozzle.

As an alternative, a filling of soft white cheese may be prepared from

| | |
|---|---|
| Full Fat Soft Cheese | 99.80% |
| Locust Bean Gum | 0.20% | and by mixing the ingredients and heating, for example with indirect steam to 75° C. Subsequently, also this type of filling is ready to be supplied to the co-extrusion nozzle. For both of the above-mentioned fillings, the viscosity thereof has been found to be in a range which allows a substantially uniform distribution of the filling in the filled sheet of process cheese substantially without any areas, where the thickness of the filling is increased, whereas the thickness of the process cheese which is present all around the filling is reduced in these areas.

The products obtained were studied with regard to the amount of filling and the distribution thereof which can be taken from a cut slice as shown in FIG. 10. It was found that filled sheets or slices of process cheese could be produced in a reliable manner, in which the filling was present with a percentage of 15% or more, based on the total weight of the slice. Further, the filling was entirely enclosed in the process cheese as shown in FIG. 10.

The invention claimed is:

1. A process of producing a filled sheet of process cheese, the process comprising:
co-extruding the process cheese and a filling into a packaging material to produce a continuous, filled strand having a thickness; and
separating the continuous, filled strand at predetermined locations to produce separate sheets, in which the filling is fully enclosed on all sides by the process cheese,
wherein the step of co-extruding the process cheese and a filling further comprises co-extruding the filling in an inner tube having an inner port for extruding the filling and an outer port for extruding the process cheese, and wherein a cross-section area of the inner port is about one sixth of a cross sectional area at a beginning of the inner tube, and wherein a cross-section area of the outer port is about one third of a cross-sectional area at a beginning of the outer tube.

* * * * *